(12) United States Patent
Fuenfgeld

(10) Patent No.: US 6,504,793 B2
(45) Date of Patent: Jan. 7, 2003

(54) METHOD AND DEVICE FOR RANGE MEASUREMENT

(75) Inventor: Martin Fuenfgeld, Hohberg (DE)

(73) Assignee: Vega Grieshaber KG, Schiltach (DE)

( * ) Notice: Subject to any disclaimer, the term of this patent is extended or adjusted under 35 U.S.C. 154(b) by 0 days.

(21) Appl. No.: 09/950,049

(22) Filed: Sep. 12, 2001

(65) Prior Publication Data

US 2002/0034123 A1 Mar. 21, 2002

Related U.S. Application Data

(60) Provisional application No. 60/273,340, filed on Mar. 6, 2001.

(30) Foreign Application Priority Data

Sep. 11, 2000 (DE) .......................... 100 44 769

(51) Int. Cl.[7] ........................ G01S 15/08; G01S 13/10
(52) U.S. Cl. .................. 367/99; 367/908; 342/124; 73/290 V; 73/290 R
(58) Field of Search .................. 367/99, 908; 342/123, 342/124; 73/290 V, 290 R

(56) References Cited

U.S. PATENT DOCUMENTS 4,785,664 A * 11/1988 Reebs .................. 73/290 V
5,734,346 A * 3/1998 Richardson et al. ........ 342/124
6,078,280 A * 6/2000 Perdue et al. ............... 342/124
6,169,706 B1 * 1/2001 Woodward et al. ........... 367/99

FOREIGN PATENT DOCUMENTS

| DE | 42 23 346 | 1/1994 |
| DE | 42 40 491 | 6/1994 |
| EP | 0 780 665 | 6/1997 |

* cited by examiner

Primary Examiner—Ian J. Lobo
(74) Attorney, Agent, or Firm—Nath & Associates PLLC; Gary M. Nath; Marvin C. Berkowitz

(57) ABSTRACT

The present invention pertains to a method for range measurement by means of a signal transmitted in the direction of an object to be measured, wherein an echo signal, on which is superimposed a first reference pulse, is received by a receive device, wherein the echo signal is compared with a second reference signal that features a second reference pulse for determining a signal travel time, and wherein a first comparison value of the echo signal and a second comparison value of the second reference signal are compared with each other for determining an amplitude offset between the echo signal and the second reference signal, and these values, in regards to time, are before the first and second reference pulses in a region of the echo signal curve and of the second reference signal curve, respectively, and in these regions, these curves feature a slope that is at least approximately zero.

9 Claims, 4 Drawing Sheets

METHOD AND DEVICE FOR RANGE MEASUREMENT

This application claims the benefit of provisional application No. 60/273,340 filed Mar. 6, 2001.

BACKGROUND OF THE INVENTION

1. Field of the Invention

The present invention pertains to a method for measuring signal travel times or ranges.

2. Description of the Related Art

Such a method is particularly suited to measuring the level in containers. From EP 0 780 665 A2, it is known to install in the container a waveguide, whose longitudinal direction runs in the direction that the level changes in the container, and to excite a high-frequency, electromagnetic signal in the waveguide. The impedance of the waveguide is changed at an interface between two media, e.g., air and a fluid, located in the container. The signal pulse excited in the waveguide by the known method is reflected in the region of the impedance change of the waveguide, and the reflected signal is received as an echo signal at the input of the waveguide. The time interval between transmitting the transmit pulse and receiving the reflected pulse is used as the measure for the range between the input of the waveguide and the location of the impedance change at the waveguide. From this time interval, the level of the material in the container can be determined.

For devices that evaluate signal travel times for range measurement, it is known from DE 42 40 491 C2 to superimpose a reference pulse on an echo signal that is reflected by an object, whose distance is to be measured. Thus, the reference pulse at the beginning of the echo signal gives information about the time of transmission of the transmit signal, so that the distance range to the object can be determined by evaluating the time difference between the reference pulse and the reflected pulse of the echo signal.

To determine the time position of the reflected pulse in the echo signal, it is known to compare the time profile of the received echo signal with the second reference signal that was formed without objects in the measurement path or with an empty container. Points in the echo signal curve where the amplitude of the echo signal curve deviate from the amplitude of the reference signal curve point to pulses due to reflection at the object or a change in impedance in the waveguide.

In this way, problems can arise from different amplitude offsets of the second reference signal or echo signal, which makes the comparison of the two signals more difficult.

SUMMARY OF THE INVENTION

Thus, the goal of the present invention is to provide a method for range measurement, in particular for level measurement, which enables a precise measurement through comparison of an echo signal with a reference signal, and with which there are no problems in connection with different amplitude offsets.

This goal is solved by a method for range measurement by means of a signal transmitted in the direction of an object to be measured by means of a transmission direction, wherein an echo signal featuring a first reference pulse is received by a receiver device, and wherein the echo signal is compared with a second reference signal that features a second reference pulse for determining a signal travel time, and wherein for determining an amplitude offset between the echo signal and the second reference signal, a first comparison value of the echo signal and a second comparison value of the second reference signal are compared with each other, and these signals, in regard to time, are before the first and second reference pulses in the regions of the echo signal curve and the second reference signal curve, respectively, and in these regions, these curves exhibit a slope that is at least approximately zero.

The present invention uses the fact that the echo signal features a constant amplitude that is different by an amplitude offset from the zero amplitude value within a time interval before the transmission of the signal pulse, and thus, before the appearance of the first reference pulse. The same applies to the second reference signal, which is a stored echo signal that was formed under certain conditions, usually for an empty container or without objects to be measured in the measurement path. In the regions of constant signal profiles before the first and second reference pulses of the echo signal and the second reference signal, the method according to the invention determines the offset between the echo signal and the second reference signal in order to better compare the echo signal and the second reference signal after the addition or subtraction of this offset from one of the two signals, and in order to thus be able to determine the reflection time of the signal pulse at the object to be measured.

The reference pulse of the echo signal and the reference signal can be pulses that have been inserted into the particular signal, especially for travel time measurement, as time reference points, or they can be pulses that in each echo signal result in a given measurement path, e.g., due to reflection of a transmitted signal at a transition between a line and a waveguide.

Advantageous configurations are the object of the invention.

The method according to the invention with offset compensation is suitable for all methods with which range measurement is performed by means of transmitting an optical, acoustic, or electromagnetic signal, and with which the range is determined by evaluating the signal travel times between transmitting a signal pulse in the direction of the object to be measured and receiving a pulse reflected at the object.

The method is particularly suited to measuring the level in containers by means of wave-bound microwave signals. The impedance of a waveguide, in which the microwave is guided, changes at the point where there is a transition between two different media, or also between two equivalent media with different densities. At this location of the impedance change, a partial reflection of the microwave signal excited in the waveguide is produced with a frequency that can be up to 2 GHz. Range measurement by means of a guided and reflected microwave is also referred to as the TDR method (TDR=Time Domain Reflectometry).

According to an embodiment of the invention, for each determination of the offset, a least upper bound (i.e., a maximum for positive pulses and a minimum for negative pulses) of the amplitude of the first reference pulse and a least upper bound of the amplitude of the second reference pulse are determined, and each time an amplitude value of the echo. signal curve and of the second reference signal curve, which lie at a predetermined time period before the respective least upper bound, are used as first and second comparison values. The time period is chosen such that the echo signal curve and the signal curve of the second reference signal exhibit at least an approximately constant amplitude during this time period before the least upper bound of the first and second reference pulses.

Instead of the maximum of the first and second reference pulses, output points for the offset determination can also be amplitude values that are under each maximum and that each have an amplitude that is a predetermined percentage of the respective maximum.

The determination of the offset between the echo signal curve and the curve of the second reference signal is done by the method according to the invention preferably by means of a signal processor, a conventional microprocessor, or a conventional computer executing a suitable program. Here, both the echo signal and also the second reference signal are provided as a sequence of detected values, wherein the frequency for generating the detected values from the time-continuous signals is greater than the maximum frequency of the two signals to be compared.

According to another embodiment of the method according to the invention, for the echo signal and the second reference signal for determining the first and second comparison values starting from the maximum or from the amplitude value that is in a fixed ratio to the maximum, adjacent amplitude values are compared with each other. Here, if regions of the signal curve are reached in which adjacent amplitude values, or adjacent detected values, are no longer different, then these amplitude values are used as comparison values.

In order to reduce the effect of unavoidably small oscillations of the echo signal and the second reference signal in the constant sections before the first and second reference pulses, several first and second comparison values are calculated, and their average value is used for determining the offset.

If necessary, in order to be able to eliminate the existing time offset between the echo signal and the second reference signal, according to another embodiment of the invention, the time position of the maximums of the first and second reference pulses are compared with each other.

A further object of the invention is a device for performing the method according to the invention.

BRIEF DESCRIPTION OF THE DRAWINGS

The present invention is explained in more detail using the following embodiments with reference to the figures. Shown in the figures are.

DETAILED DESCRIPTION

In the figures, when not otherwise indicated, equivalent designations indicate equivalent parts and signals with equivalent meaning.

Figure 1:
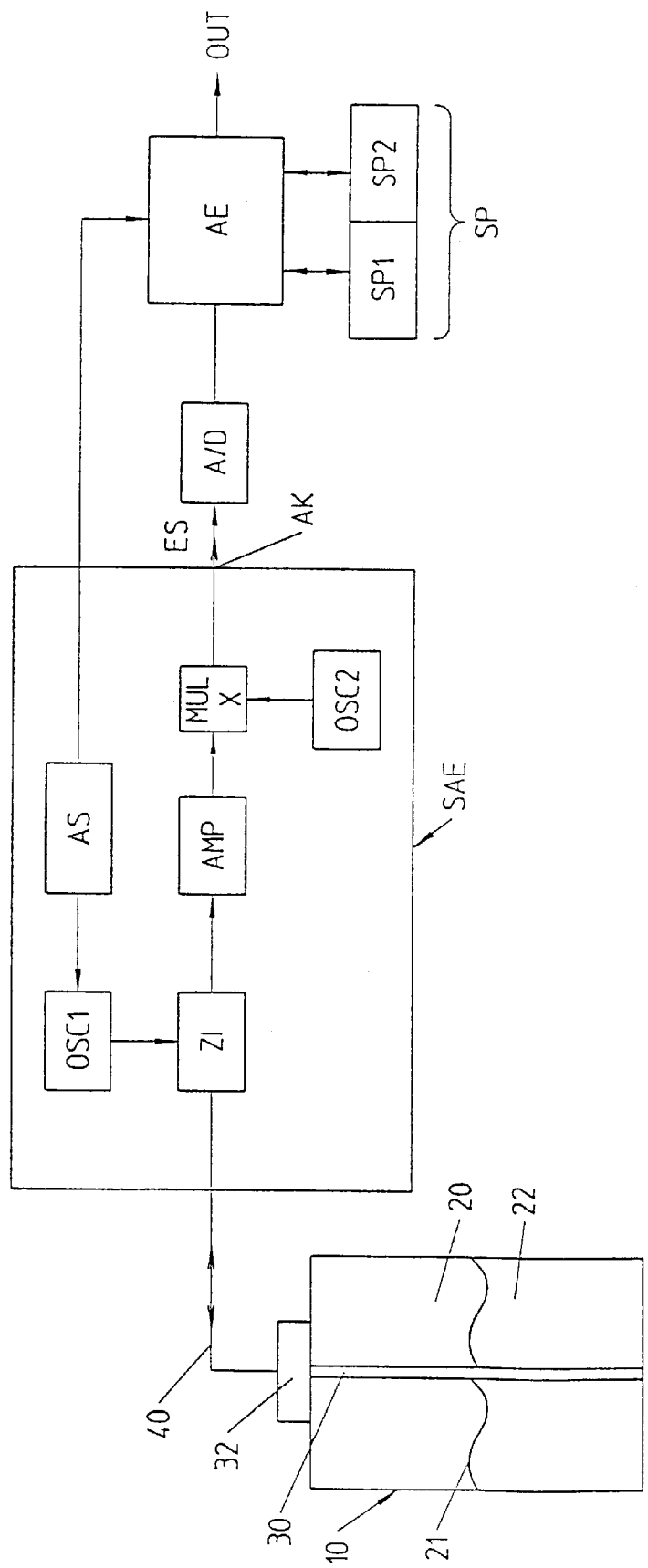
FIG. 1, an embodiment of a device according to the invention for performing a method according to the invention.

FIG. 1 shows an embodiment of a device according to the invention for performing a method according to the invention for range measurement, in particular, for level measurement. The measurement principle of the device illustrated in FIG. 1 is based on the measurement of signal travel times, or on the measurement of delay times between the transmission of a measurement signal and the reception of a reflected signal or an echo signal. Thus, for measuring the level, a waveguide 30 is installed in a container 10. The waveguide can be designed as a coaxial line, a single wire, or a two-wire line, and it extends downwards from the top in the container 10. In the upper region of the container 10, there is a connection arrangement that is used to attach the waveguide 30 to the container 10 and to connect the waveguide to a connecting line 40 to a transmit and receive unit SAE.

The container is used to store a medium 22, in particular, a fluid or bulk material, whose level in FIG. 1 is indicated by the reference number 21. Above the fluid, there is another medium 20, in particular, a gas, e.g., air.

By means of the connecting line 40, the transmit and receive unit SAE is connected to the waveguide 30. The transmit and receive unit injects a microwave signal required for the level measurement by means of the illustrated device into the connecting line 40 and receives an echo signal, which results from the reflection of the transmit signal in the waveguide 30, over the connecting line 40, and which is made available as a processed echo signal ES at an output terminal AK. With the device according to the invention, one uses the fact that there is a change in impedance at the waveguide 30 in the transition region between the air 20 and the fluid 22, whereby at this point the transmit signal is partially reflected in the waveguide 30. From the time difference between the transmission of the pulse and the reception of the reflected pulse, the level of the fluid 22 in the container 10 can be determined. For determining the time difference between the transmission of the pulse and the reception of the reflected pulse, a first reference pulse or a first reference signal are superimposed over the echo signal by the device according to FIG. 1, wherein the first reference pulse is used as a time reference relative to the transmit pulse.

Such a transmit and receive unit SAE for output of a transmit pulse for reception of a reflected pulse and for forming an echo signal from the reflected pulse and a first reference signal is known from DE 42 40 491 C2. Here, the description section in this document is particularly emphasized. Such a transmit and receive unit SAE features a first oscillator OSC1 that provides a transmit pulse and that is controlled by a process control AS. This pulse is injected by means of a circulator into the waveguide 30 by the connecting line 40. A portion of the power of the transmit pulse is supplied through the circulator ZI to the amplifier AMP, wherein a mixer with a multiplier MUL and a second oscillator OSC2 are connected to the output of the amplifier AMP, which generates an echo signal ES with a low frequency from the high-frequency amplifier output signal. By means of the circulator ZI, the pulses ES reflected in the waveguide 30 are also supplied to the amplifier AMP and to the mixer MUL, OSC2. Thus, the circulator superimposes on the signal resulting from the reflected pulses a first reference signal derived from the transmit pulse for forming the echo signal ES.

According to the invention, an analog-digital converter and an evaluation unit AE with a memory SP are connected to the output of the output terminal AK of the transmit and receive unit SAE, whose function will be explained in greater detail.

For measuring the level by means of the device illustrated in FIG. 1, initially an echo signal ES is generated for an empty container 10 and then stored after analog-digital conversion in the memory unit SP as a second reference signal. An echo signal generated for a filled container 10 is different from the echo signal for an empty container by at least one additional pulse that results from the reflection of the transmit pulse at the interface 21 between the liquid 22 and the gas 20. The level in the container 10 can be determined by means of the time at which this additional pulse is received, which is determined by comparing the second reference signal with the echo signal.

Figure 2:
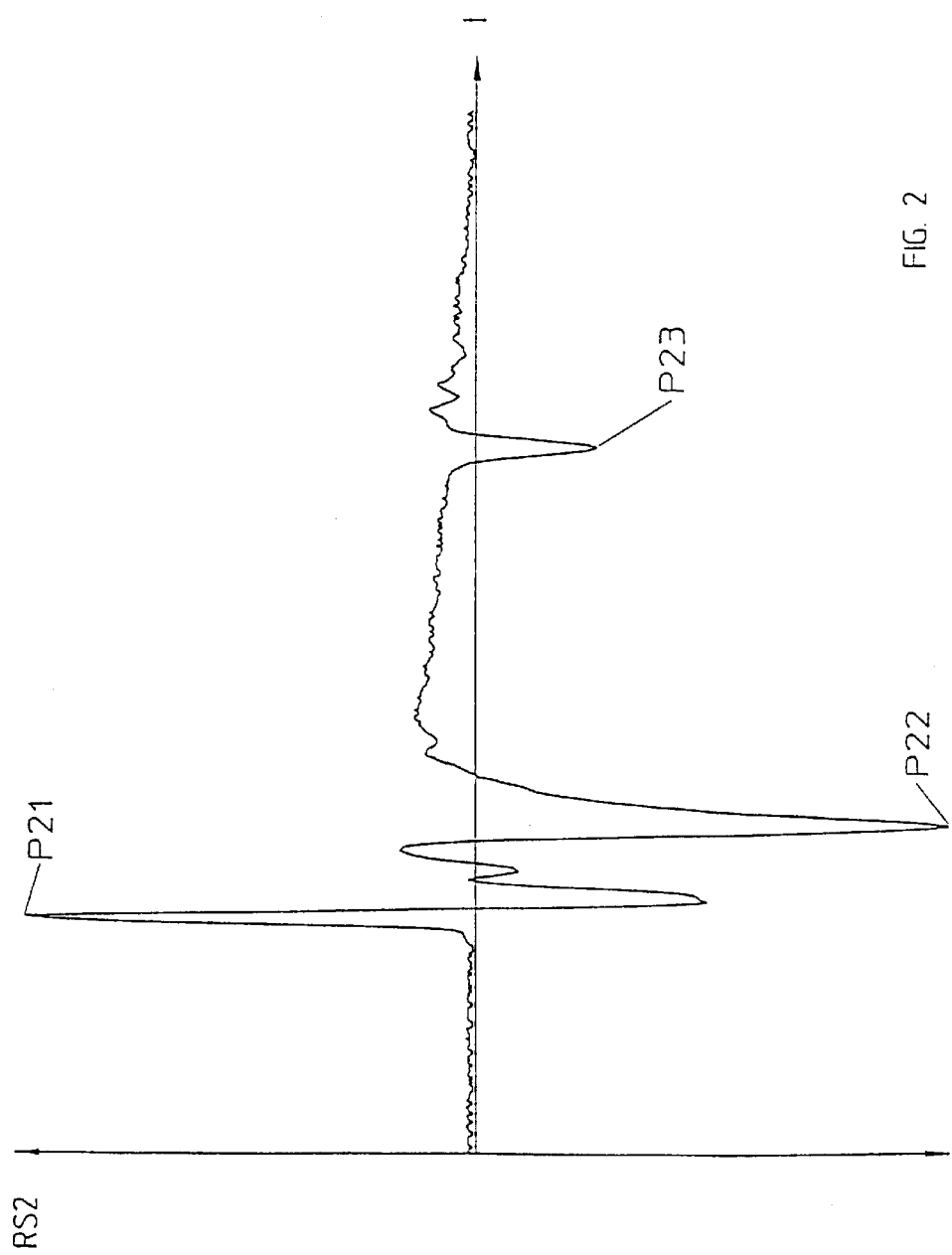
FIG. 2, a signal profile of a second reference signal.

FIG. 2 shows a typical signal profile of an echo signal determined with an empty container 10, and this signal is used as the second reference signal RS2. This signal is initially at a low level, when no reflected signals are received from the waveguide 30, and then features a second reference pulse P21 that indicates the output of the transmit pulse at the waveguide 30 and that is superimposed in the circulator ZI with the transmission of the transmit pulse on the echo signal. The next clearly defined point in the profile of the second reference signal RS2 is a negative pulse P22 that results from the reflection of the transmit pulse at the waveguide 30 at the transition from the connecting line 40 to the waveguide 30. In FIG. 2, another negative pulse P23 of the second reference signal RS2 results from the reflection of the transmit pulse at the end of the open waveguide 30. This pulse P23 can also be positive, depending on the type and method in which the waveguide is installed in the container.

Figure 3:
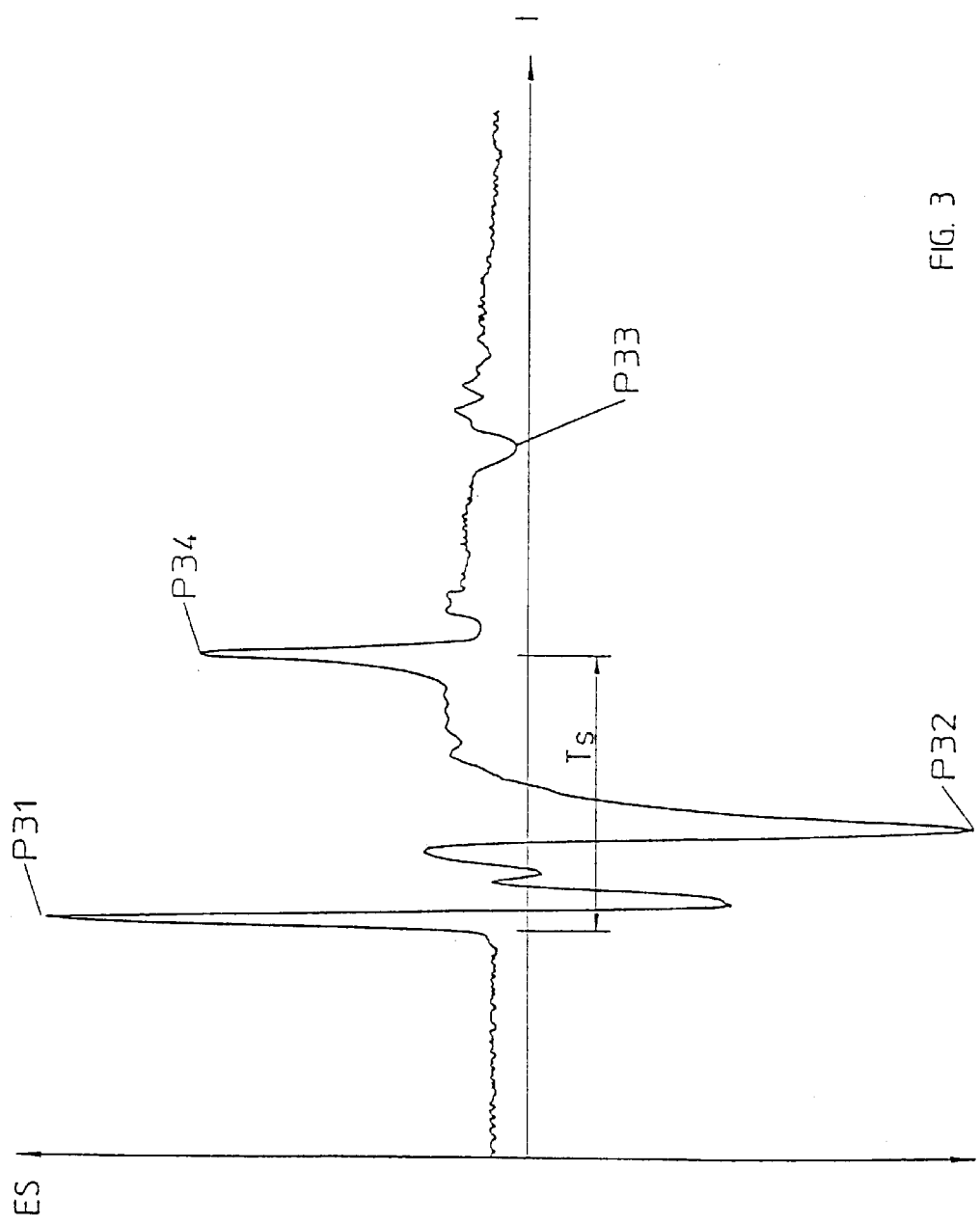
FIG. 3, a signal profile of an echo signal.

While the second reference signal RS2 represents the echo signal for the empty container 10, FIG. 3 shows the echo signal for the filled container 10. This echo signal ES is initially at a low level, at which no reflected pulses or signals are received from the waveguide 30. In connection with this approximately constant region, the echo signal ES features a first reference pulse P31 that marks the time of transmission of the transmit pulse and that corresponds to the pulse P21 of the second reference signal RS2. A later negative pulse P32 results from the reflection of the transmit pulse at the transition between the connecting line 40 and the waveguide 30 and corresponds to the pulse P22 of the second reference signal RS2.

Like the pulse P23 of the second reference signal RS2, the pulse P33 that is even later in time results from the reflection of the transmit pulse at the end of the waveguide 30. This pulse P33, like pulse P22, is only present for poorly reflecting media, such as, e.g., oil.

Between the pulse P32 and the pulse P33, the echo signal ES features the positive pulse P34 that results from the reflection of the transmit pulse in the waveguide at the interface 21 between the fluid 22 and the gas 20, at which there is a change in impedance of the waveguide 30. From the time distance Ts between the first reference pulse P31 that represents a reference for the transmission of the transmit pulse in the echo signal ES and the pulse P34, the signal's travel time up to the reflection at the interface 21 and thus the level of the fluid in the container 22 can be determined.

For determining the time position of the pulse P34 in the signal profile of the echo signal ES, the method according to the invention provides that a second reference signal RS2 determined for an empty container is compared with the received echo signal ES, wherein the additional pulse P34 for the echo signal ES relative to the second reference signal RS2 represents the reflection of the transmit pulse at the interface between the two media 22, 20. In the simplest case, the second reference signal RS2 is subtracted from the echo signal ES. Thus, the subtraction is done incrementally through subtraction of amplitude values that are located at corresponding time positions of the signal profiles of the second reference signal RS2 and the echo signal ES. Thus, it is assumed that the profiles of the signals to be compared, whose detected values are stored, e.g., in the memory arrangement SP, exhibit no time offset. A time, from which the echo signal ES is greater than the second reference signal RS2, identifies a reflection of the transmit signal at the interface between the fluid 22 and the gas 20.

For such an action, problems can produce an amplitude offset of the second reference signal RS2 or the echo signal ES. In the present case, each amplitude offset indicates a value around which the echo signal ES and the second reference signal RS2 are different from zero, although no reflected signal is coupled through the connecting line 40 from the waveguide 30 into the transmit and receive unit SAE. The offset of the echo signal ES is clear in FIG. 3 in the time interval before the first reference signal P31, which is before the transmission of the transmit pulse.

Before comparing the echo signal ES and the second reference signal RS2 for determining the time position of the reflected pulse P34, the method according to the invention initially determines the amplitude offset of the second reference signal RS2 and the amplitude offset of the echo signal ES. The difference between these two amplitude offsets is then taken out of the signal with the larger amplitude offset or added to the signal with the smaller amplitude offset in order to prevent the influence of the amplitude offset on the comparison of the second reference signal RS2 and the echo signal ES.

Figure 4:
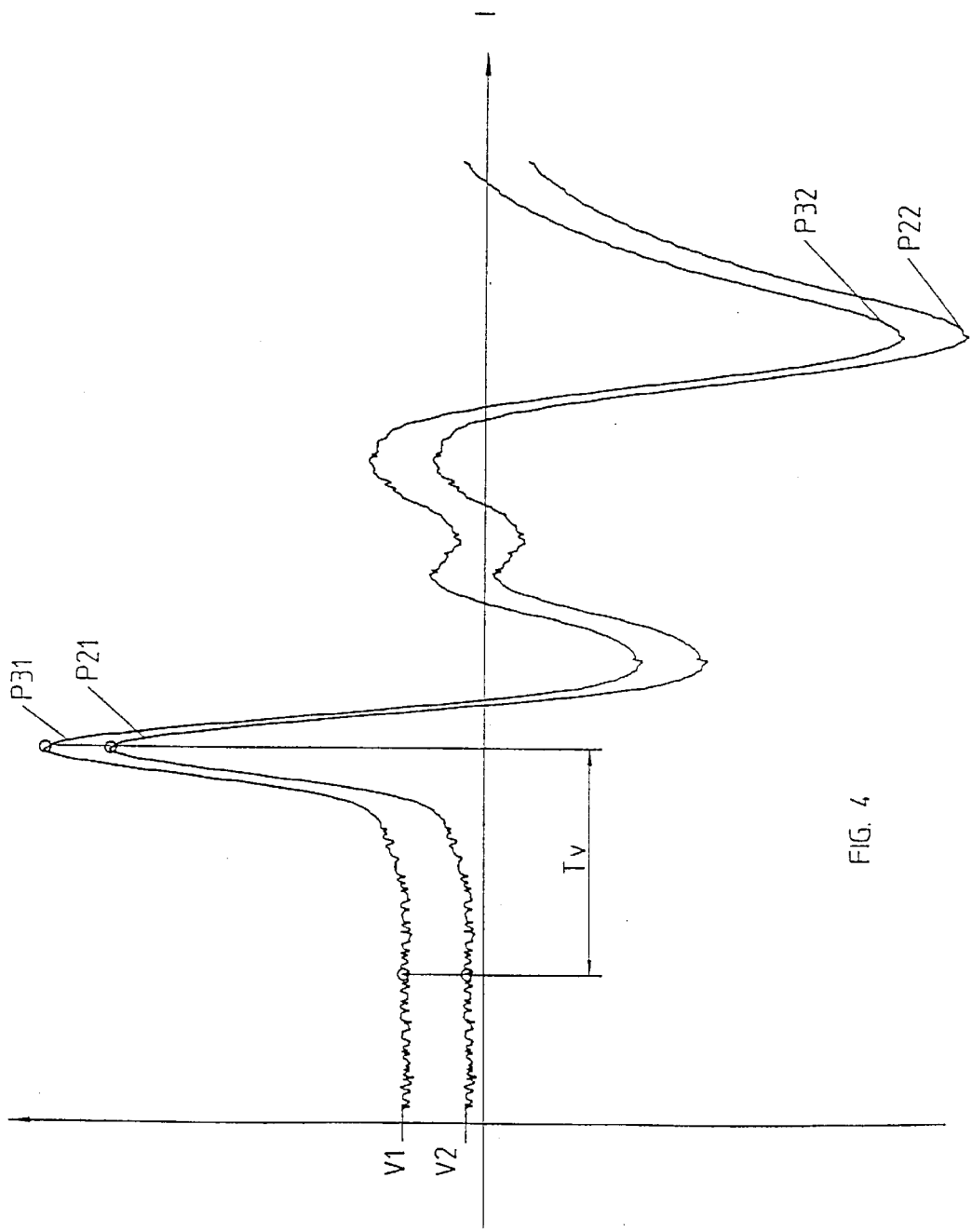
FIG. 4, a common sectional representation of the second reference signal and echo signal for determining the offset.

The method according to the invention for determining the amplitude offset is explained in the following with reference to FIG. 4, in which the echo signal ES and the second reference signal RS2 are illustrated in sections up to the pulses P22, P32. For the representation according to FIG. 4, it is assumed that the echo signal ES and the second reference signal RS2 feature no time offset or that such a time offset has already been eliminated for further processing.

Next, the method determines the maximum of the first reference pulse P31 of the echo signal ES and the maximum of the second reference pulse P21 of the second reference signal RS2. These maximum values each represent the first relative maximum in the signal profiles of the second reference signal RS2 and the echo signal ES because both the second reference signal RS2 and also the echo signal ES are located before these reference pulses P31, P21 that represent a reference for the time of the transmit pulse at an approximately constant and low level. Starting from the time, at which the maximum of the first and second reference pulse P31, P21 are determined, a first comparison value V1 on the curve of the echo signal ES and a second comparison value V2 on the curve of the second reference signal RS2 are determined that are each approximately at the time period Tv before each maximum. Thus, the time period Tv is chosen so that the times, at which the comparison values V1, V2 are determined, are before the rising edges of the first and second reference pulses P31, P21.

The comparison value V1 represents the measure for the amplitude offset of the echo signal ES and the second comparison value V2 represents the measure for the amplitude offset of the second reference signal RS2, wherein these amplitude offsets are taken into account for the subsequent comparison of the echo signal ES and the second reference signal RS2 for determining the time position of the pulses P34 reflected at the interface 21.

Due to parasitic effects, a noise signal of low amplitude is typically superimposed on both the echo signal ES and the second reference signal RS2. This noise signal is particularly noticeable in the approximately constant regions before the reference pulses P21, P31. Thus, according to an embodiment of the invention, several first comparison values that are each separated from each other in time are generated on the echo signal curve ES and a corresponding number of second comparison values are generated on the signal curve of the second reference signal RS2, and the averages of the first comparison values and the second comparison values are calculated for determining each amplitude offset.

In addition to the maximums of the first and second reference pulses P31, P21, with the determination of the comparison values V1, V2, points on the echo signal curve ES and the second reference signal curve RS2 can be output that come before the maximums in time and whose amplitudes are in a fixed ratio to the respective maximum amplitude value.

In order to guarantee that the signal profiles are still constant and the rising edges of the reference pulses P31, P21 are not yet reached at the times at which the comparison values V1, V2 are determined, starting from the maximum values of the first and second reference pulses P31, P21, corresponding, time-adjacent amplitude values of one of the curves, i.e., the echo signal curve ES or the second reference signal curve RS2, can be compared with one another. If the amplitudes of these adjacent points of the signal curves no longer deviate from each other, then the constant region of the signal curves before the reference pulses P21, P31 is reached and can be used as the corresponding comparison value.

If the second reference signal curve RS2 and the echo signal curve ES are shifted relative to each other in time, such a time offset can be determined and likewise compensated for with reference to the maximums, or corresponding amplitude values at the signal edges, of the reference pulses P21, P31.

Pulse P21 or the corresponding pulse P31 of the reference signal results from the coupling of the reference pulse in the echo signal. Instead of pulses P21, P31, the output point for determining the first and second comparison values can also be taken from the pulses P22, P32 that result from the reflection of the transmit signal at the transition between the line 40 (FIG. 1) and the waveguide 30. This reflection appears for each signal transmitted by means of the arrangement according to FIG. 1, so that the resulting pulses P21, P31 can be used as reference points for determining the offset. By using pulses P22, P32, the coupling of the first reference pulse P21 in the echo signal can be eliminated, which reduces the circuit expense for a circuit arrangement for performing the method according to the invention.

By using the negative pulses P22, P32, the minimums of the pulses P22, P32, or values at a fixed time interval before or after the minimums, are initially determined on the echo signal curve and the reference signal curve. Starting from these values, as explained above, comparison values for determining the offset are determined on both curves.

For performing the method according to the invention, the device according to FIG. 1 features an analog-digital converter, whose output is connected to the output terminal of the transmit and receive unit SAE. A time-discrete signal formed by means of the analog-digital converter is supplied to an evaluation unit AE that is connected to a memory unit SP with at least two memory locations SP1, SP2 for storing the second reference signal RS2 and an echo signal ES. The second reference signal RS2 determined with an empty container 10 is stored in one of the memories SP1, SP2, and for determining the level for each measurement process, is compared with an echo signal ES, which is temporarily stored in the other of the two memories SP2, SP1. The evaluation unit AE features means for comparing a section of the echo signal stored in the memory SP with a section of the second reference signal RS2 stored in the memory SP and for determining the amplitude offset according to the previously described method.

The section of the echo signal ES and of the second reference signal RS2, which is used for performing the method according to the invention or which is stored, preferably begins a certain time period before the transmit pulse, i.e., before the first and second reference pulses P31, P21, which indicates the transmit pulse in the echo signal ES and in the second reference signal RS, and ends a certain time period after the signal pulses P23, P33, which indicates in the echo signal ES and in the reference signal RS2 the reflection of the transmit signal at the open end of the waveguide 30.

The evaluation unit connected to the output of the analog-digital converter with the memory SP is preferably a digital signal processor or an off-the-shelf computer, which by means of the described method in consideration of the amplitude offset of the echo signal ES and the second reference signal RS2 determines the time interval between the first reference pulse P31 and the pulse P34, and from this time interval, determines the level in the container 10 with knowledge of the frequency of the transmitted microwave signal.

List of Reference Numbers
AE Evaluation unit
AMP Amplifier
AS Process control
ES Echo signal
MUL Multiplier
OSC1 First oscillator
OSC2 Second oscillator
P21 Second reference pulse
P22, P32 Pulse due to reflection at beginning of the waveguide
P23, P33 Pulse due to reflection at end of the waveguide
P31 First reference pulse
P34 Pulse due to reflection at the interface 21
PS2 second reference signal
SP Memory
SP1 First memory cell
SP2 Second memory cell
Ts Time interval between pulses
ZI Circulator
10 Container
20 Gas
21 Boundary region
22 Fluid
30 Waveguide
32 Connection device
40 Connecting line

What is claimed is:
1. Method for range measurement comprising:
   transmitting a signal in a direction of an object to be measured;
   receiving an echo signal comprising a first reference signal or a first reference pulse by a receiver device;
   determining a signal travel time by comparing the echo signal with a second reference signal comprising a second reference pulse;
   determining an amplitude offset between the echo signal and the second reference signal, by comparing a first amplitude comparison value of the echo signal and a second amplitude comparison value of the second reference signal with each other, each measured at a same time before a time of the first and second reference pulses in regions of a curve of the echo signal and a curve of the second reference signal, respectively, in which the curves each exhibit a slope that is at least approximately zero.

2. Method according to claim 1, in which the first reference pulse is superimposed on the echo signal.

3. Method according to claim 1, in which a corresponding least upper bound of amplitudes of the first reference pulse and of the second reference pulse is determined and in which a corresponding amplitude value of the echo signal curve and of the second reference signal curve is used as the first and second amplitude comparison values, respectively, these values being at a certain time period before the respective least upper bound.

4. Method according to claim 3, in which, for determining the first and second comparison values, instead of the least upper bound of the first and second reference pulses, one of the corresponding amplitude values before the least upper bound is output, where this amplitude value equals a predetermined portion of the least upper bound of the first and second reference pulses.

5. Method according to claim 1, in which several first comparison values and several second comparison values are formed, and their average values are compared with each other for determining the offset.

6. Method according to claim 1, in which adjacent amplitude values before a least upper bound of the first reference pulse are compared with each other, wherein when the two adjacent values are no longer different, that value is used as the first comparison value; and in which adjacent amplitude values before a least upper bound of the second reference pulse are compared with each other, and when the two adjacent values are no longer different, that value is used as the second comparison value.

7. Device for range measurement comprising:
   a transmit and receive device for transmitting a signal and for receiving an echo signal comprising a first reference pulse or signal;
   a memory device for storing a second reference signal;
   an evaluation device for comparing the echo signal and the second reference signal;
   characterized in that for determining an amplitude offset between the echo signal and the second reference signal, the evaluation device further comprises:
   a first unit for determining a first comparison value at a same time before the first reference pulse of the echo signal, where this value is located in a signal region of a curve of the echo signal with a slope of zero; and
   a second unit for determining a second comparison value at the same time before a second reference pulse of the echo signal, where this value is located in a signal region of a curve of the second reference signal with a slope of zero.

8. Device according to claim 7, in which the transmit and receive device is designed such that the first reference signal is superimposed on the echo signal.

9. Method according to claim 1, in which a time position of a least upper bound of the first reference pulse and of the second reference pulse is calculated for determining a time offset between the echo signal and the second reference signal.

* * * * *